United States Patent [19]

Bogdanovic

[11] Patent Number: 4,869,514
[45] Date of Patent: Sep. 26, 1989

[54] CONTACT SEAL

[75] Inventor: Bogdan Bogdanovic, Krugersdorp, South Africa

[73] Assignee: Ha Rubber and Plastics (Pty) Ltd., Tansvaal Province, South Africa

[21] Appl. No.: 91,709

[22] Filed: Sep. 1, 1987

[30] Foreign Application Priority Data

Sep. 10, 1986 [ZA] South Africa .................. 86/6895

[51] Int. Cl.⁴ ............................................. F16J 15/32
[52] U.S. Cl. ................................................... 277/152
[58] Field of Search ................. 277/153, 152, 41, 51, 277/29

[56] References Cited

U.S. PATENT DOCUMENTS

| 2,476,324 | 7/1949 | Reich | 277/152 |
|---|---|---|---|
| 2,990,220 | 6/1961 | Malone | 277/152 |
| 3,833,228 | 9/1974 | Gilliam | 277/205 |
| 4,053,166 | 10/1977 | Domkowski | 277/152 |
| 4,219,205 | 8/1980 | Christiansen et al. | 277/152 X |
| 4,519,617 | 5/1985 | Butler | 277/153 |
| 4,630,636 | 12/1986 | Cutcher | 277/154 X |

FOREIGN PATENT DOCUMENTS

| 602792 | 6/1948 | United Kingdom . | |
|---|---|---|---|
| 700811 | 12/1953 | United Kingdom | 277/152 |
| 710037 | 6/1954 | United Kingdom . | |
| 1222267 | 2/1971 | United Kingdom . | |
| 1283255 | 7/1972 | United Kingdom . | |
| 1488982 | 10/1977 | United Kingdom . | |
| 1547346 | 6/1979 | United Kingdom . | |

Primary Examiner—Donald A. Griffin
Attorney, Agent, or Firm—Ladas & Parry

[57] ABSTRACT

A lip member for a contact seal is annular and has at least one inwardly directed lip operable, in use, to bear against a shaft in sealing engagement with the shaft. The lip member has a locating formation for removably locating it in a housing of the contact seal. The housing comprises an outer shell and a holder nestably locatable within the outer shell and co-operating with the locating formation of the lip member and sandwiching at least a portion of the lip member between the holder and the outer shell.

6 Claims, 3 Drawing Sheets

CONTACT SEAL

This invention relates to a contact seal, particularly, but not necessarily exclusively, intended for use on conveyor rollers. It relates also to a lip member for a contact seal.

In conveyor rollers, seals are necessary to minimise the ingress of dirt which may cause damage to bearings on which the conveyor roller runs. Contact seals have been used in the past usually in the form of a housing, e.g. of metal, with a synthetic rubber lip or lips bonded thereto and in contact with a shaft of the conveyor roller. Circular springs are often used to urge the lip or lips into contact with the shaft. Generally, commercially available oil seals such as are used in the motor industry have been used in conveyor rollers in the past. When a conveyor is long and therefore has a great number of contact seals in contact with the shafts of the conveyor rollers, a great deal of drag is applied by the seals to the shafts. This drag requires a great deal of power to start the conveyor moving after it has been stopped. It is an object of this invention to offer a solution to the problem.

According to the invention there is provided a lip member for a contact seal, the lip member being annular and having at least one inwardly directed lip operable, in use, to bear against a shaft in sealing engagement with the shaft, the lip member having a locating formation for removably locating it in a housing.

The lip member and locating formation may be integrally formed.

The locating formation may be in the form of a circumferentially extending recess defined between an outer periphery of the lip member and a skirt radially spaced from and attached to said outer periphery. In one embodiment, the circumferentially extending recess may be in the form of a channel. In another embodiment, the recess may be substantially of V-shape in cross section.

The lip member may have a plurality of axially spaced inwardly directed lips integrally formed therewith. The lips may extend towards the shaft at an acute angle of less than 90 degrees relative to the rotational axis of the shaft.

Instead of a plurality of lips, separate lip members may be provided in stacked relationship. The locating formation may then have an axially extending nose matingly receivable in the recess of an adjacent lip member.

The invention extends further to a contact seal which includes a lip member as above described removably located within a housing, the housing comprising an outer shell and a holder nestably locatable within the outer shell and co-operating with the locating formation of the lip member and sandwiching at least portion of the lip member between the holder and the outer shell.

The outer shell may have a flange spaced radially inwardly from its outer periphery, the flange being receivable in and co-operating with the recess of the lip member.

The holder may be in the form of a disc with an axially protruding circular holding formation nestably receivable between an inner wall of the outer periphery of the shell and an outer wall of the locating formation of the lip member.

The holder and the outer shell may have at least one engagement formation for retaining the holder within the outer shell.

Various embodiments of the invention are now described by way of example with reference to the accompanying drawings, in which FIG. 1 shows an axial section through one form of lip member in accordance with the invention;

Figure 1:
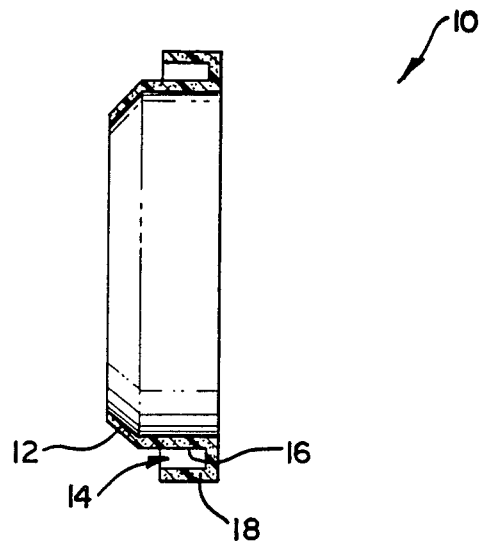

Referring to the drawings, reference numeral 10 generally indicates a lip member for a contact seal. The lip member is annular and has a sloping inwardly directed lip 12 which in use, bears in sealing engagement against a shaft (not shown). The lip member has a locating formation for removably locating it in a housing. In the FIGS. 1 and 2 embodiment, the locating formation includes a circumferentially extending channel-like recess 14 defined between the outer periphery 16 of the lip member and skirt 18 radially spaced from and attached to the outer periphery 16. In the FIG. 3 embodiment, a V-shaped recess 14 is provided.

Figure 2:
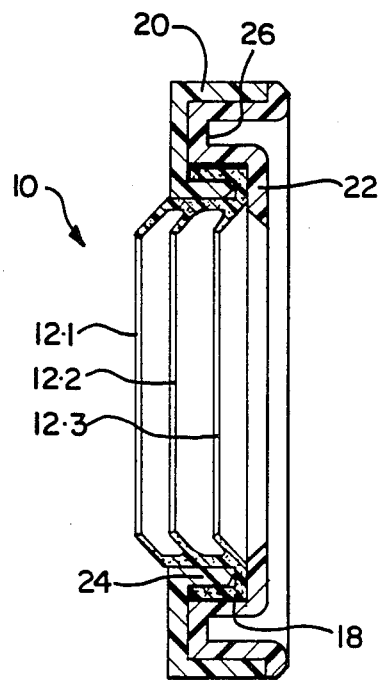
FIG. 2 shows an axial section of a modified form of lip member located within a contact seal housing in accordance with the invention.

In the FIG. 2 embodiment, the lip member 10 has a plurality of axially spaced inwardly directed lips 12.1, 12.2 and 12.3 integrally formed therewith. The FIG. 3 embodiment has only one lip 12 but has a nose 15 matingly shaped to be received in the recess 14 of an adjacent lip member arranged in stacked relationship.

Figure 6:
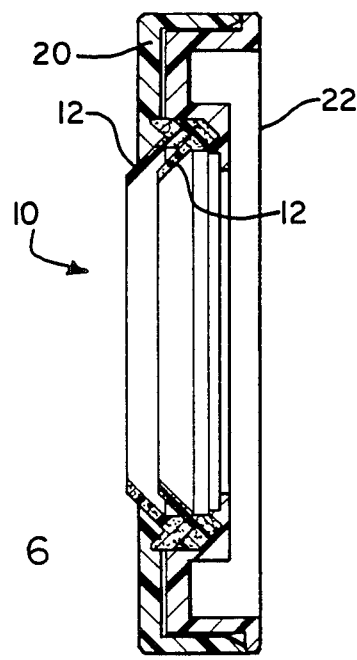
FIG. 6 shows an axial section of a contact seal formed from the lip member, holder and outer shell of FIGS. 3 to 5 respectively.

In FIGS. 2 and 6, the lip member 10 is shown in position in a housing. The housing includes an outer shell 20 and a holder 22 nestably receivable within the outer shell 20 and sandwiching portion of the lip member between the holder and the outer shell. In FIG. 2, the outer shell 20 has a flange 24 spaced radially inwardly from its outer periphery and the flange is receivable in the channel-like recess 14 of the lip member 10 of FIG. 1. The holder 22 is in the form of a disc with an axially protruding circular holding formation 26 nestably receivable between an inner wall of the outer periphery of the shell 20 and an outer wall of the skirt 18.

Figure 3:
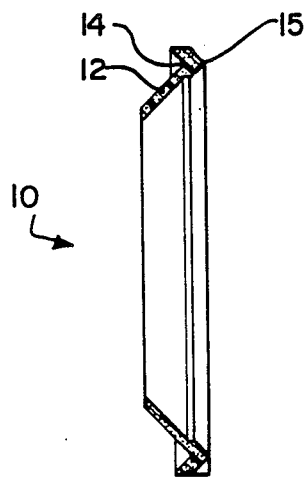
FIG. 3 shows an axial section of yet a further form of lip member in accordance with the invention.
Figure 4:
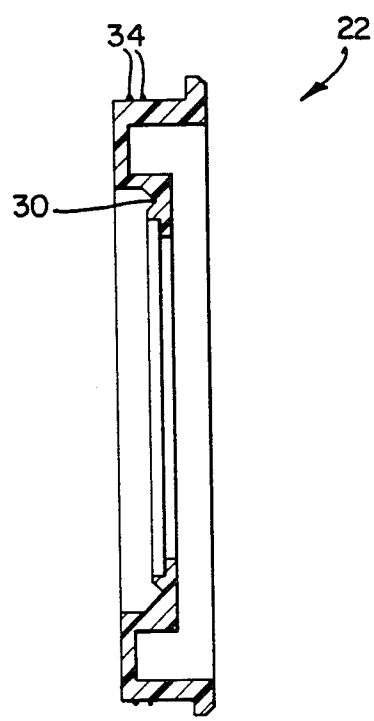
FIG. 4 shows an axial section of a holder used with the FIG. 3 lip member.

In the FIGS. 3 to 6 embodiment, the outer shell 20 and holder 22 are similar except that the outer shell 20 has, instead of the flange 24, a nose 28 matingly receivable in the V-shaped recess 14 of the lip member 10 of FIG. 3. Also, the holder 22 has a mating V-shaped recess 30 corresponding in shape to the nose 15 of the lip member 10 of FIG. 3. Thus one or more lip members can be stacked adjacent one another between the holder 22 and outer shell 20.

Figure 5:
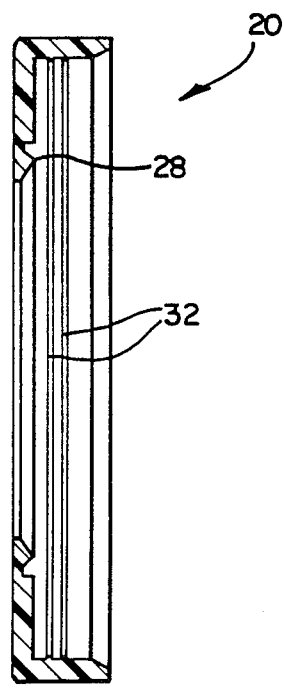
FIG. 5 shows an axial section of an outer shell used with the FIG. 3 lip member.

As shown in FIG. 5, the outer shell 20 has a pair of circumferential ribs 32 on its inner circumferential wall which form engagement formations which co-operate with mating engagement formation 34 provided on the holder 22 to retain the holder within the outer shell with a snap action resilient interference fit.

The invention illustrated provides a lip member which forms a sub-assembly of a contact seal and which accordingly can readily be replaced when worn. Also, the lip member can be made of a relatively light flexible material thereby minimising the drag applied by the lip 12 or the lips 12.1, 12.2 and 12.3 to a shaft of a conveyor roller. The lip member may be for example of polyurethane and the housing may be of a moulded synthetic plastics material. The outer shell 20 can be made with close tolerances thereby ensuring a neat fit into a conveyor roller. Also, the holder 22 can be made with close tolerances to fit neatly into the outer shell and minimise ingress of dirt between it and the outer shell.

What we claim is:

1. A lip member for a contact seal, the lip member being annular and having a lip operable in use, to bear against a shaft in sealing engagement with the shaft and extending at an acute angle of less than 90 degrees relative to a rotational axis of the shaft, the lip member having a locating formation operable removably and replaceably to locate the lip member on a housing, the locating formation having on one of its sides an axially extending nose, and having on its opposite side a mating recess to permit the nose to seat in the recess of an adjacent lip member thereby to permit a plurality of lip members to be arranged in stacked parallel relationship relative to the housing and co-axially around the shaft, the recess and the nose being substantially of V-shape in cross section and the lip being attached only by a base to the locating formation thereby to provide a minimum of support to the lip by the locating formation in a radial direction and to minimize drag applied by the lip to the shaft.

2. A contact seal which includes a lip member as claimed in claim 1, the contact seal including a housing comprising an outer shell and a holder nestably locatable within the outer shell and co-operating with the locating formation of the lip member and sandwiching at least portion of the lip member between the holder and the outer shell.

3. A contact seal as claimed in claim 2, in which the outer shell has a flange spaced radially inwardly from its outer periphery, the flange being receivable in and co-operating with the recess of the lip member.

4. A contact seal as claimed in claim 3, in which the holder is in the form of a disc with an axially protruding holder formation nestably receivable between an inner wall of the outer periphery of the shell and an outer wall of the locating formation of the lip member.

5. A contact seal as claimed in claim 4, in which at least one engagement formation is provided on the holder and the outer shell for retaining the holder within the outer shell.

6. A lip member for a contact seal, the lip member being annular and having a plurality of inwardly directed lips operable, in use, to bear against a shaft in sealing engagement with the shaft, the lips extending towards the shaft is spaced parallel relationship at an acute angle of less than 90 degrees relative to a rotational axis of the shaft, and the lips having a common locating formation operable removably and replaceably to locate the lip member on a housing, the locating formation being in the form of an axially directed sleeve from which the lips extend inwardly at an inclination to the sleeve and a skirt radially outwardly spaced from the sleeve, the sleeve and the skirt defining between them a circumferentially extending channel shaped recess operable to receive a portion of a housing.

* * * * *